(12) United States Patent
Kim

(10) Patent No.: US 12,438,152 B2
(45) Date of Patent: Oct. 7, 2025

(54) POSITIVE ACTIVE MATERIAL PRECURSOR FOR RECHARGEABLE LITHIUM BATTERY, POSITIVE ACTIVE MATERIAL FOR RECHARGEABLE LITHIUM BATTERY, METHOD OF PREPARING THE POSITIVE ACTIVE MATERIAL, AND RECHARGEABLE LITHIUM BATTERY INCLUDING THE POSITIVE ACTIVE MATERIAL

(71) Applicant: Samsung SDI Co., Ltd., Yongin-si (KR)

(72) Inventor: Do-Yu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1069 days.

(21) Appl. No.: 16/985,567

(22) Filed: Aug. 5, 2020

(65) Prior Publication Data
US 2021/0043931 A1    Feb. 11, 2021

(30) Foreign Application Priority Data
Aug. 8, 2019    (KR) .................. 10-2019-0096750

(51) Int. Cl.
*H01M 4/525*    (2010.01)
*H01M 4/02*    (2006.01)
(Continued)

(52) U.S. Cl.
CPC ......... *H01M 4/525* (2013.01); *H01M 4/0416* (2013.01); *H01M 4/505* (2013.01);
(Continued)

(58) Field of Classification Search
CPC ..... H01M 4/5825; H01M 4/525; H01M 4/505
See application file for complete search history.

(56) References Cited

U.S. PATENT DOCUMENTS

| 2012/0141873 A1 | 6/2012 | Kim et al. |
| 2012/0231341 A1 | 9/2012 | Kim et al. |
(Continued)

FOREIGN PATENT DOCUMENTS

| CN | 102683696 A | 9/2012 |
| CN | 105375026 A | 3/2016 |
(Continued)

OTHER PUBLICATIONS

Korean Intellectual Property Office, Office action issued in corresponding Korean Patent Application No. 10-2019-0096750, Nov. 6, 2020, 8 pages.
(Continued)

*Primary Examiner* — Nathanael T Zemui
(74) *Attorney, Agent, or Firm* — Womble Bond Dickinson (US) LLP

(57) ABSTRACT

An embodiment provides a positive active material precursor for a rechargeable lithium battery including: a nickel-based composite precursor including a secondary particle comprising a plurality of primary particles that are aggregated together, the nickel-based composite precursor having a central portion and a surface portion, and the central portion of the nickel-based composite precursor including a phosphate.

13 Claims, 6 Drawing Sheets

(51) Int. Cl.
- *H01M 4/04* (2006.01)
- *H01M 4/505* (2010.01)
- *H01M 4/58* (2010.01)
- *H01M 10/0525* (2010.01)

(52) U.S. Cl.
CPC ..... *H01M 4/5825* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2016/0043388 A1 | 2/2016 | Oh | |
| 2017/0301916 A1* | 10/2017 | Shin | H01M 4/525 |
| 2017/0338471 A1 | 11/2017 | Zheng et al. | |
| 2018/0183046 A1* | 6/2018 | Jin | H01M 4/1315 |
| 2021/0363027 A1* | 11/2021 | Toma | C01G 53/04 |

FOREIGN PATENT DOCUMENTS

| | | |
|---|---|---|
| CN | 107074587 A | 8/2017 |
| KR | 10-2012-0061374 A | 6/2012 |
| KR | 10-2015-0050459 A | 5/2015 |
| KR | 10-2016-0052428 A | 5/2016 |
| KR | 10-2017-0096673 A | 8/2017 |

OTHER PUBLICATIONS

Office Action dated Jan. 2, 2024 (including a Search Report dated Dec. 28, 2023), of the corresponding Chinese Patent Application No. 202010787245.9, including translation 22pp.

* cited by examiner

POSITIVE ACTIVE MATERIAL PRECURSOR FOR RECHARGEABLE LITHIUM BATTERY, POSITIVE ACTIVE MATERIAL FOR RECHARGEABLE LITHIUM BATTERY, METHOD OF PREPARING THE POSITIVE ACTIVE MATERIAL, AND RECHARGEABLE LITHIUM BATTERY INCLUDING THE POSITIVE ACTIVE MATERIAL

CROSS-REFERENCE TO RELATED APPLICATION

This application claims priority to and the benefit of Korean Patent Application No. 10-2019-0096750 filed in the Korean Intellectual Property Office on Aug. 8, 2019, the entire contents of which are hereby incorporated by reference.

BACKGROUND

1. Field

A positive active material precursor for a rechargeable lithium battery, a positive active material for a rechargeable lithium battery, a method of preparing the same, and a rechargeable lithium battery including the same are disclosed.

2. Description of the Related Art

Rechargeable lithium battery technology has been utilized in various fields, such as energy storage and electric vehicles, as well as portable electronic devices through remarkable development.

In general, a positive active material, one of the important constituent materials of a rechargeable lithium battery, includes lithium metal oxides such as $LiCoO_2$, $LiMn_2O_4$, $LiNiO_2$, $LiNi_{1-x}Co_xO_2$ (0<x<1), and/or the like. Lithium nickel-cobalt-aluminum oxide in which a portion of cobalt is replaced with nickel and aluminum instead of $LiCoO_2$, a positive active material such as low-cost $LiMnO_4$ and/or $LiFePO_4$ have been developed and commercialized to a substantial degree.

Recently, a nickel-based lithium transition metal oxide among the lithium metal oxides has received attention because of its high capacity. The nickel-based lithium transition metal oxide has high capacity characteristics, as compared with other metal oxides, and thus is widely applied to high capacity/high power rechargeable lithium batteries but it has an unstable crystal structure, as compared with $LiCoO_2$, and thus has problems of storage characteristics, cycle-life characteristics, stability, and the like.

In order to address these problems, various studies are being conducted, and one of the representative methods is coating the positive active material. The coating is a simple and effective strategy for preventing or reducing a side reaction of the positive active material with an electrolyte on the surface thereof, reducing irreversible capacity during the initial charge and discharge, improving ion conductivity to enhance electrochemical performance or prevent or reduce a sharp temperature increase, and/or the like.

In order to coat a nickel-based lithium transition metal oxide positive active material, an inorganic material-based coating agent such as $AlF_3$, $AlPO_4$, $CoPO_4$, $TiO_2$, $V_2O_5$, $Al_2O_3$, $CeO_2$, $ZrO_2$, $SiO_2$, $ZrO$, $MgO$, and $Sm_2O_3$ is used. These inorganic material-based coating agents reinforce surface stability at a high voltage to reduce irreversible capacity, improve battery performance, and enhance electronic conductivity and accordingly, may improve high rate capability and cycle-life characteristics.

As another coating method of the nickel-based lithium transition metal oxide positive active material, a study of coating the positive active material with Li—Mn—$PO_4$ and Li—Ni—$PO_4$ which are lithium-containing active material compositions and $Li_3PO_4$, $Li_4SiO_4$, LiPON, Li—La—Ti—O, and $LiNbO_3$ which are solid electrolyte materials has been conducted. These materials have been developed to prevent or reduce the side reaction with an electrolyte on the positive active material surface and in addition, to improve lithium ion conductivity rather than the electronic conductivity.

The coating materials may be coated to be present only on the surface of a secondary oxide particle or between a plurality of primary oxide particles by considering that some secondary oxide particles may be broken through the rolling process. Because an electrode plate is generally prepared through the rolling process, substantial research on forming the coating at or in grain boundaries inside the secondary oxide particle or between the plurality of primary oxide particles has been recently made.

The coating between the plurality of primary oxide particles may be performed by preparing a precursor, mixing it with a coating material, and calcining the mixture at a suitable or appropriate temperature for a suitable or appropriate time to coat the coating material through the grain boundaries of the secondary oxide particle deep into the interior thereof. This positive active material coated up to the grain boundaries of the secondary oxide particle or between the plurality of primary oxide particles has a greater coating effect than a positive active material coated only on the surface of the secondary oxide particles.

However, phosphate having a relatively large particle size and the like may not be uniformly coated on the grain boundaries of the secondary oxide particle or between the primary oxide particles through the aforementioned process but mostly coated only on the surfaces of the secondary oxide particle.

SUMMARY

Embodiments of the present disclosure relate to coating a coating material having a large particle size on the grain boundaries of a secondary oxide particle or between primary oxide particles. An embodiment provides a positive active material precursor capable of realizing high capacity, high power, and improving cycle-life characteristics and stability problems.

Another embodiment provides a positive active material.

Another embodiment provides a method of preparing the positive active material.

Another embodiment provides a rechargeable lithium battery including the positive active material.

An embodiment provides a positive active material precursor for a rechargeable lithium battery including a nickel-based composite precursor including a secondary particle comprising a plurality of primary particles that are aggregated together, wherein the nickel-based composite precursor having a central portion and a surface portion and the central portion of the nickel-based composite precursor includes a phosphate.

The nickel-based composite precursor may be selected from metal hydroxide or metal oxide, wherein the metal is at least one selected from Mn, Ni, Co, Al, Fe, V, Ti, and Cr.

The surface portion of the nickel-based composite precursor may include a first surface portion contacting the central portion of the nickel-based composite precursor and a second surface portion surrounding the first surface portion, and at least one selected from the first surface portion and the second surface portion may not include phosphate.

The central portion of the nickel-based composite precursor may have a volume of 20 volume % to about 70 volume % relative to a total volume of the secondary particle.

Another embodiment provides a positive active material for a rechargeable lithium battery including a nickel-based composite oxide including a secondary particle comprising a plurality of primary particles that are aggregated together, the nickel-based composite oxide having a central portion and a surface portion, and the central portion including a lithium transition metal phosphate.

A concentration of the lithium transition metal phosphate in the central portion of the nickel-based composite oxide may be higher than or equal to a concentration of the lithium transition metal phosphate in the surface portion of the nickel-based composite oxide.

The lithium transition metal phosphate may be present at grain boundaries of the secondary particle of the nickel-based composite oxide or between adjacent ones of the plurality of primary particles of the nickel-based composite oxide (e.g., at spaces between the primary particles).

The central portion of the nickel-based composite oxide may have a volume of about 20 volume % to about 70 volume % relative to a total volume of the secondary particle.

The nickel-based composite oxide may be a compound represented by Chemical Formula 1:

$Li_aNi_xCo_yMn_zM_{1-x-y-z}O_2$.              Chemical Formula 1

In Chemical Formula 1,
$0.8 \leq a \leq 1.2$, $0.5 \leq x \leq 1$, $0 \leq y \leq 0.5$, $0 \leq z \leq 0.5$, $0.5 \leq x+y+z \leq 1$, and M is at least one selected from Mn, Ni, Co, Al, Fe, V, Ti, and Cr.

The lithium transition metal phosphate may be included in an amount of about 0.01 wt % to about 2 wt % based on a total amount of the positive active material.

The positive active material may further include a coating layer including a lithium transition metal phosphate on the surface portion of the nickel-based composite oxide.

The coating layer may have a thickness of less than or equal to about 3 μm.

Another embodiment provides a method of preparing a positive active material for a rechargeable lithium battery, the method including: preparing a mixed solution including a transition metal solution including a nickel raw material, a manganese raw material, a cobalt raw material, a phosphorus-containing compound including at least one selected from a phosphoric acid and a phosphate, and, optionally, further including a metal raw material; introducing the mixed solution, a chelating agent, and a precipitating agent into a reactor to prepare a secondary particle precursor by a co-precipitation method, and then drying the secondary particle precursor to prepare a nickel-based composite precursor; and mixing the nickel-based composite precursor and a lithium raw material and calcining the mixture to prepare the positive active material.

The nickel-based composite precursor may be selected from metal hydroxide or metal oxide, wherein the metal is at least one selected from Mn, Ni, Co, Al, Fe, V, Ti, and Cr.

The phosphorus-containing compound may include at least one selected from $NH_4H_2PO_4$, $H_3PO_4$, and $(NH_4)_2HPO_4$.

The phosphorus-containing compound may be mixed in a mole ratio in a range of about 0.01 mole to about 1 mole based on 100 moles of the nickel-based composite precursor.

Another embodiment provides a rechargeable lithium battery including a positive electrode including the positive active material; a negative electrode; and an electrolyte.

It is possible to effectively improve cycle-life deterioration and stability problems that occur when implementing a high-capacity and high-power rechargeable lithium battery.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
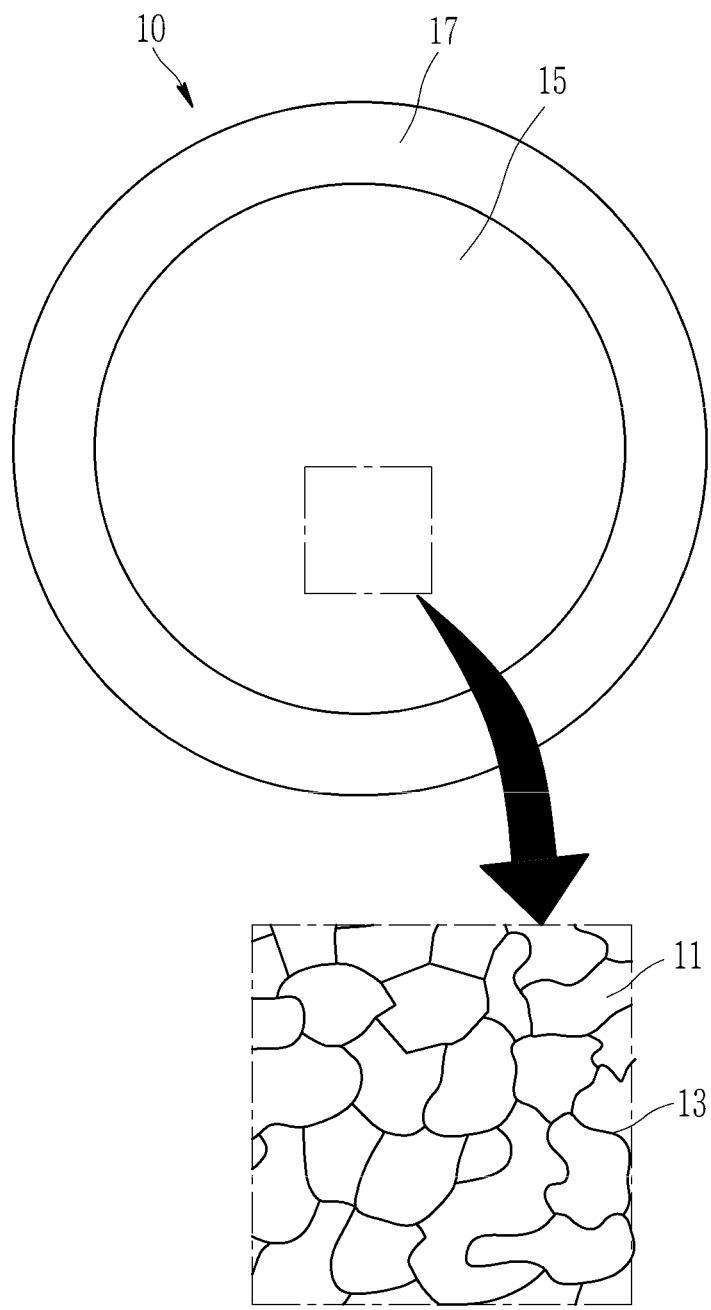
FIG. 1 is a schematic cross-sectional view of a nickel-based composite oxide secondary particle of a positive active material according to an embodiment.

Hereinafter, embodiments of the present disclosure are described in more detail. However, these embodiments are exemplary, the present disclosure is not limited thereto, and the present disclosure is defined by the scope of the appended claims and equivalents thereof.

As used herein, when a specific definition is not otherwise provided, "average particle diameter" may refer to $D_{50}$, which is a particle size ($D_{50}$) at a 50% volume ratio in a cumulative size-distribution curve.

As used herein, terms in the singular and the singular forms "a," "an" and "the," for example, optionally include plural referents unless the content clearly dictates otherwise.

A positive active material precursor according to an embodiment includes a nickel-based composite precursor including secondary particle in which a plurality of primary particles are aggregated, wherein the nickel-based composite precursor has a central portion and a surface portion and the central portion includes a phosphate.

The nickel-based composite precursor may be selected from metal hydroxide or metal oxide, wherein the metal is at least one selected from Mn, Ni, Co, Al, Fe, V, Ti, and Cr.

The surface portion of the nickel-based composite precursor may surround the central portion. The surface portion may include a first surface portion contacting (e.g., physically contacting) the central portion and a second surface portion surrounding the first surface portion. In some embodiments, at least one selected from the first surface portion and the second surface portion may not include a phosphate.

The central portion may have a volume of about 20 volume % to about 70 volume %, for example, greater than or equal to about 20 volume %, greater than or equal to about 25 volume %, greater than or equal to about 30 volume %, greater than or equal to about 35 volume %, or greater than or equal to about 40 volume %, and less than or equal to about 70 volume %, less than or equal to about 65 volume %, less than or equal to about 60 volume %, less than or equal to about 55 volume %, or less than or equal to about 50 volume % relative to a total volume of the secondary particle of the nickel-based composite precursor.

The surface portion of the nickel-based composite precursor according to an embodiment may include the first surface portion adjacent to the central portion and the second surface portion surrounding the first surface portion. On the other hand, the first surface portion may have a volume of about 10 volume % to about 90 volume %, for example, greater than or equal to about 10 volume %, greater than or equal to about 20 volume %, greater than or equal to about 30 volume %, greater than or equal to about 40 volume %, or greater than or equal to about 45 volume %, and less than or equal to about 90 volume %, less than or equal to about 80 volume %, less than or equal to about 70 volume %, less than or equal to about 60 volume %, or less than or equal to about 55 volume % based on a total volume of the surface portion of the nickel-based composite precursor.

A concentration of phosphate in the central portion of the nickel-based composite precursor may be higher than or equal to a concentration of the phosphate in the surface portion. For example, the concentration of the phosphate in the central portion of the nickel-based composite precursor may be higher than or equal to the concentration of the phosphate in at least one selected from the first surface portion and the second surface portion. In some embodiments, the concentration of the phosphate in the central portion may be higher than or equal to the concentration of the phosphate in the first surface portion, and the concentration of the phosphate in the first surface portion may be higher than or equal to the concentration of the phosphate in the second surface portion. Further, the concentration of the phosphate in the central portion may be higher than or equal to the concentration of the phosphate in the first surface portion and the second surface portion, and the concentration of the phosphate in the first surface portion may be lower than or equal to the concentration of the phosphate in the second surface portion.

Accordingly, in embodiments of the present disclosure it is possible to more effectively prevent or reduce side reactions with the electrolyte, thereby improving lithium ion conductivity in a positive active material formed from the nickel-based composite precursor.

The nickel-based composite precursor may be a compound represented by Chemical Formula 2.

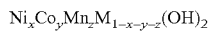   Chemical Formula 2

In Chemical Formula 2,
$0.5 \leq x \leq 1$, $0 \leq y \leq 0.5$, $0 \leq z \leq 0.5$, $0.5 \leq x+y+z \leq 1$, and M is at least one selected from Mn, Ni, Co, Al, Fe, V, Ti, and Cr.

In addition, in Chemical Formula 2, $0.5 \leq x \leq 0.8$, $0.1 \leq y \leq 0.3$, $0.1 \leq z \leq 0.3$, $0.7 \leq xyz \leq 1$, and M may be at least one selected from Mn, Ni, Co, and Al. When the nickel-based composite precursor is a compound represented by Chemical Formula 2, a high capacity and high-power rechargeable lithium battery may be realized by forming a positive active material from the nickel-based composite precursor.

A method of preparing the positive active material precursor for a rechargeable lithium battery according to embodiments of the present disclosure is described with the following method for producing the positive active material.

Hereinafter, a positive active material according to an embodiment is described with reference to FIG. 1.

FIG. 1 is a schematic cross-sectional view of a nickel-based composite oxide secondary particle included in a positive active material according to an embodiment.

The positive active material includes a nickel-based composite oxide including nickel-based composite oxide secondary particle 10 in which a plurality of nickel-based composite oxide primary particle 11 are aggregated together. According to embodiments of the present disclosure, the nickel-based composite oxide secondary particle 10 has a central portion 15 and a surface portion 17, and the central portion 15 includes a lithium transition metal phosphate.

The nickel-based composite oxide may have the central portion 15 and the surface portion 17 surrounding the central portion 15. The central portion 15 may have a volume of about 20 volume % to about 70 volume %, for example, greater than or equal to about 20 volume %, greater than or equal to about 25 volume %, greater than or equal to about 30 volume %, greater than or equal to about 35 volume %, or greater than or equal to about 40 volume %, and less than or equal to about 70 volume %, less than or equal to about 65 volume %, less than or equal to about 60 volume %, less than or equal to about 55 volume %, or less than or equal to about 50 volume % relative to a total volume of the nickel-based composite oxide secondary particle 10.

The central portion 15 of the nickel-based composite oxide may include the lithium transition metal phosphate, and at least a portion of the surface portion 17 of the nickel-based composite oxide may not include the lithium transition metal phosphate.

The surface portion 17 of the nickel-based composite oxide according to an embodiment may include a first surface portion adjacent to the central portion 15 and a second surface portion surrounding the first surface portion. The first surface portion may include a lithium transition metal phosphate, and the second surface portion may not include the lithium transition metal phosphate. In some embodiments, the first surface portion may have a volume of about 10 volume % to 90 volume %, for example, greater than or equal to about 10 volume %, greater than or equal to about 20 volume %, greater than or equal to about 30 volume %, greater than or equal to about 40 volume %, or greater than or equal to about 45 volume %, and less than or equal to about and 90 volume %, less than or equal to about 80 volume %, less than or equal to about 70 volume %, less than or equal to about 60 volume %, or less than or equal to about 55 volume % based on a total volume of the surface portion of the nickel-based composite oxide.

A concentration of the lithium transition metal phosphate in the central portion 15 of the nickel-based composite oxide may be higher than or equal to a concentration of the lithium transition metal phosphate in the surface portion 17. For example, the concentration of the lithium transition metal phosphate in the central portion 15 of the nickel-based composite oxide may be higher than or equal to the concentration of the lithium transition metal phosphate of in at least of the first surface portion and/or the second surface portion. In some embodiments, the concentration of the lithium transition metal phosphate of the central portion 15 may be higher than or equal to the concentration of the lithium transition metal phosphate of the first surface portion, and the concentration of the lithium transition metal phosphate of the first surface portion may be higher than or equal to the concentration of lithium transition metal phosphate in the second surface portion.

The lithium transition metal phosphate may be present at or in the grain boundary 13 of the nickel-based composite oxide secondary particle 10 or between a plurality of nickel-based composite oxide primary particles (spaces between the primary particles). For example, the lithium transition metal phosphate may be present between at grain boundary between crystal grains of the secondary particle, and/or may be between adjacent ones of the primary particles.

Because a coating material such as a phosphate and/or the like has a relatively large particle size, when the coating material is mixed with a nickel-based composite precursor and then, calcined at a suitable or appropriate temperature for a suitable or appropriate time, the coating may be formed not inside of a nickel-based composite oxide secondary particle but only on the surfaces thereof. However, when a positive active material is prepared according to embodiments of the present disclosure, the coating material may be coated at and/or on grain boundaries of a nickel-based composite oxide secondary particle or among and/or between nickel-based composite oxide primary particles and thus may more effectively prevent or reduce the side reaction with an electrolyte, as compared with the case of including a lithium transition metal phosphate only on the surface portion of the nickel-based composite oxide secondary particle, thereby improving lithium ion conductivity in a resultant positive active material.

The lithium transition metal phosphate may be included in an amount of about 0.01 wt % to about 2 wt %, for example greater than or equal to about 0.05 wt %, greater than or equal to about 0.1 wt %, or greater than or equal to about 0.15 wt % and less than or equal to about 2 wt %, less than or equal to about 1.5 wt %, less than or equal to about 1 wt %, less than or equal to about 0.75 wt %, or less than or equal to about 0.5 wt % based on a total amount of the positive active material. When the lithium transition metal phosphate is included in the foregoing content range, side reaction with the electrolyte may be prevented or reduced to improve cycle-life characteristics of the battery.

The nickel-based composite oxide may be represented by Chemical Formula 1:

   Chemical Formula 1

$Li_aNi_xCo_yMn_zM_{1-x-y-z}O_2$

In Chemical Formula 1,
$0.8 \leq a \leq 1.2$, $0.5 \leq x \leq 1$, $0 \leq y \leq 0.5$, $0 \leq z \leq 0.5$, $0.5 \leq x+y+z \leq 1$, and M is at least one selected from Mn, Ni, Co, Al, Fe, V, Ti, and Cr.

In Chemical Formula 1, $0.95 \leq a \leq 1.1$, $0.5 \leq x \leq 0.8$, $0.1 \leq y \leq 0.3$, $0.1 \leq z \leq 0.3$, $0.7 \leq x+y+z \leq 1$, and M may be at least one selected from Mn, Ni, Co, and Al.

When the nickel-based composite oxide is a compound represented by Chemical Formula 1, a high capacity and high-power rechargeable lithium battery may be realized.

The nickel-based composite oxide may further include a coating layer including a lithium transition metal phosphate on the surface portion 17, and further improve performance of the battery by including a set or specific metal element in addition to the phosphate in the coating layer, if necessary or desired.

The coating layer may have a thickness of less than or equal to about 3 μm (e.g., greater than 0 μm to 3 μm), for example greater than or equal to about 0.5 μm, greater than or equal to about 1 μm, or greater than or equal to about 1.5 μm, and less than or equal to about and 3 μm, less than or equal to about 2.5 μm, or less than or equal to about 2 μm.

The nickel-based composite oxide secondary particle 10 may have an average particle diameter of about 4 μm to about 30 μm for example, about 8 μm to about 25 μm and the nickel-based composite oxide primary particle 11 have an average particle diameter of about 30 nm to about 3 μm for example, about 100 nm to about 1 μm.

A mixture density of the positive active material may be about 2.5 g/cm³ to about 4.5 g/cm³, for example about 2.5 g/cm³ to about 4.0 g/cm³. When the mixture density of the positive active material is within the foregoing range, capacity characteristics of the battery may be improved.

A BET specific surface area of the positive active material may be about 0.2 m²/g to about 2.0 m²/g, for example, about 0.5 m²/g to about 1.5 m²/g. When the BET specific surface area of the positive active material is within the foregoing range, capacity characteristics of the battery may be improved.

Another embodiment provides a method of preparing the positive active material.

Preparing Method 1

An embodiment provides a method of preparing a positive active material for a rechargeable lithium battery that includes preparing a mixed solution including a transition metal solution including a nickel raw material, a manganese raw material, a cobalt raw material, a phosphorus-containing compound including at least one of phosphoric acid and phosphate, and, optionally, further including a metal raw material; introducing the mixed solution, a chelating agent, and a precipitating agent into a reactor to prepare a secondary particle precursor by a co-precipitation method, and then drying the secondary particle precursor to prepare a nickel-based composite precursor, and mixing the nickel-based composite precursor and a lithium raw material and then calcining the resultant mixture to prepare the positive active material.

The nickel-based composite precursor may be selected from metal hydroxide or metal oxide, wherein the metal is at least one selected from Mn, Ni, Co, Al, Fe, V, Ti, and Cr.

In some embodiments, the process of preparing the secondary particle precursor by the co-precipitation method is as follows.

A mixed solution including a transition metal solution including a nickel raw material, a manganese raw material, a cobalt raw material, a phosphorus-containing compound including at least one of phosphoric acid and phosphate, and, optionally, further including a metal raw material; a chelating agent, and a precipitating agent are introduced into the reactor and reacted by a co-precipitation method. A stirring power of the reactor may be in the range of about 1.0 kW/m³ to about 5.0 kW/m³, for example about 2.5 kW/m³ to about 4.0 kW/m³, and the temperature in the reactor may be maintained at about 25° C. to about 55° C. to produce a secondary particle precursor.

Non-limiting examples of the nickel raw material include $Ni(OH)_2$, NiO, NiOOH, $NiCO_3 \cdot 2Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, a fatty acid nickel salt, and a nickel halide. Among them, in a calcining process, the material that contains no nitrogen atom or sulfur atom such as $Ni(OH)_2$, NiO, NiOOH, $NiCO_3 \cdot 2Ni(OH)_2 \cdot 4H_2O$, and $NiC_2O_4 \cdot 2H_2O$ may be suitable or desirable, from the viewpoint of not generating harmful substances such as $NO_x$ and $SO_x$ during the calcining process. These nickel raw materials may be used alone or in a combination of two or more thereof.

Non-limiting examples of the manganese raw materials include manganese oxides such as $Mn_2O_3$, $MnO_2$, and $Mn_3O_4$, $MnCO_3$, $Mn(NO_3)_2$, $MnSO_4$, manganese salts such as manganese acetate, manganese dicarboxylate, manganese citrate, and manganese fatty acid salts, manganese oxyhydroxide, and manganese halide such as manganese chloride. Among them, $MnO_2$, $Mn_2O_3$, and $Mn_3O_4$ are suitable or desirable because they do not generate gases such as $NO_x$, $SO_x$, and $CO_2$ during a calcining process, and may be obtained at low cost as industrial raw materials. These manganese raw materials may be used alone or in a combination of two or more thereof.

Non-limiting examples of the cobalt raw materials may include $Co(OH)_2$, CoOOH, CoO, $Co_2O_3$, $Co_3O_4$, $Co(OCOCH_3)_2 \cdot 4H_2O$, $CoCl_2$, $Co(NO_3)_2 \cdot 6H_2O$, and $Co(SO_4)_2 \cdot 7H_2O$. Of these, $Co(OH)_2$, CoOOH, CoO, $Co_2O_3$, and $Co_3O_4$ are suitable or desirable in that no harmful substances such as $NO_x$ and $SO_x$ are generated during calcining treatment. $Co(OH)_2$ and CoOOH are more suitable or desirable from the viewpoint of being industrially cheap and having high reactivity. These cobalt raw materials may be used alone or in a combination of two or more thereof.

The metal raw materials may include oxides and/or salt compounds (e.g., halides, carboxylic acid salts, etc.) including at least one transition metal selected from Mn, Ni, Co, Al, Fe, V, Ti, and Cr.

The phosphorus-containing compound may be phosphoric acid, phosphate or a combination thereof, and, for example, $NH_4H_2PO_4$, $H_3PO_4$, $(NH_4)_2HPO_4$, and/or the like. Among them, $NH_4H_2PO_4$ may be more suitable or desirable as the phosphorus-containing compound. The phosphorus-containing compounds may be used alone or in a combination of two or more thereof.

The phosphorus-containing compound may be mixed in an amount of about 0.01 mole to about 1 mole, for example about 0.05 mole to about 0.8 mole or about 0.1 mole to about 0.6 mole, relative to 100 moles of the nickel-based composite precursor.

Subsequently, a product including the prepared secondary particle precursor is partially removed from the reactor to prepare a nickel-based composite precursor slurry solution, and the resultant is filtered, washed, and dried to obtain a nickel-based composite precursor containing a phosphate therein.

The filtering process and washing process are not particularly limited, and may be any suitable or appropriate process generally used in the art.

The drying process may be performed in a hot air oven at a temperature in a range of about 50° C. to about 300° C. for a time period in a range of about 12 hours to about 30 hours, for example, for about 20 hours to about 28 hours.

Subsequently, the prepared nickel-based composite precursor and the lithium raw material such as, for example, $Li_2CO_3$, $LiNO_3$, $LiNO_2$, LiOH, $LiOH \cdot H_2O$, LiH, LiF, LiCl, LiBr, LiI, $CH_3OOLi$, $Li_2O$, $Li_2SO_4$, lithium dicarboxylate, lithium citrate, lithium fatty acid salt, and/or alkyl lithium are mixed. Herein, a mole ratio of Li:(Ni+Co+Mn) may be greater than about 1:1. For example, the mole ratio of Li:(Ni+Co+Mn) may be about 1.01:1 to about 1.06:1, and, for example, about 1.01:1 to about 1.03:1.

The nickel-based composite precursor may further comprise a doping material together with a lithium raw material. As the doping material, a compound including at least one selected from Mn, Ni, Co, Al, Fe, V, Ti, Zr, Mg, and Cr may be used, and, for example, a compound including Al, Ti, Zr, or a combination thereof used may be used.

The obtained mixture is treated by heat. The heat treatment is performed under a condition determined depending on a composition of the nickel-based composite precursor and lithium raw materials used therein. For example, the heat treatment temperature may be greater than or equal to about 700° C. and less than or equal to about 1000° C., less than or equal to about 950° C., less than or equal to about 900° C., or less than or equal to about 800° C. In the heat treatment, the temperature condition is maintained for a set or predetermined time and then decreased down to about 10° C. to about 40° C. at a set or predetermined rate.

In the heat treatment, a general metal doping material (e.g., Al, Mg, Ti, and the like) is doped inside the nickel-based composite oxide primary particles (inside the lattice of the primary particles), but the phosphate ($PO_4$) does not flow into the lattice but exists as a coating form including a lithium transition metal phosphate at or in grain boundaries inside the secondary oxide particle and/or between the plurality of nickel-based composite oxide primary particles.

Preparing Method 2

Another embodiment provides a method of preparing a positive active material for a rechargeable lithium battery that includes preparing a mixed solution including a transition metal solution including a nickel raw material, a manganese raw material, a cobalt raw material, a phosphorus-containing compound including at least one of phosphoric acid and phosphate, and, optionally, further including a metal raw material; and introducing the mixed solution, a chelating agent, and a precipitating agent into a reactor to prepare a central portion and at least a portion of a surface portion, for example a first surface portion of secondary particle precursor by a co-precipitation method, and subsequently, introducing the transition metal solution, a chelating agent, and a precipitating agent into a reactor to form a second surface portion on the central portion and at least a portion of the surface portion, for example the first surface portion by a co-precipitation method and to prepare secondary particle precursor, drying the secondary particle precursor to prepare a nickel-based composite precursor, and mixing the nickel-based composite precursor and a lithium raw material and then calcining the mixture to prepare the positive active material.

The nickel-based composite precursor may be selected from metal hydroxide or metal oxide, wherein the metal is at least one selected from Mn, Ni, Co, Al, Fe, V, Ti, and Cr.

The process of preparing the secondary particle precursor by the co-precipitation method is as follows.

The center portion and at least a portion of the surface portion of the secondary particle precursor are the same as the secondary particle precursor of Preparation Method 1. The mixed solution is the same as the mixed solution of Preparation Method 1.

Subsequently, the second surface portion is formed on the center portion and at least a portion of the surface portion of the secondary particle precursor.

A transition metal solution including a nickel raw material, a manganese raw material, and a cobalt raw material, and, optionally, further including a metal raw material; a chelating agent; and a precipitating agent; is introduced into a reactor including secondary particle precursor in which the central portion and at least a portion of the surface portion are formed, and a second surface portion is formed on the central portion and at least a portion of the surface portion, for example, the first surface portion of the secondary particle precursor by a co-precipitation method to prepare secondary particle precursor having a central portion and a surface portion (first and second surface portions).

A stirring power of the reactor may be in a range of about 1.0 kW/m$^3$ to about 5.0 kW/m$^3$ range, for example about 1.5 kW/m$^3$ to about 4.0 kW/m$^3$ and the temperature in the reactor may be maintained at about 25° C. to about 55° C.

The transition metal solution, chelating agent, and precipitating agent are the same as in Preparation Method 1.

Subsequently, the product including the secondary particle precursor having the central portion and the surface portion is partially removed from the reactor to prepare the nickel-based composite precursor slurry solution, and filtered, washed, and dried to prepare a nickel-based composite precursor including a phosphate therein.

The filtering process, washing process, and drying process are the same as in Preparing Method 1.

Subsequently, the prepared nickel-based composite precursor and a lithium raw material are mixed and calcined to prepare the positive active material. The mixing process and the calcining process are the same as in Preparing Method 1.

Another embodiment provides a rechargeable lithium battery including a positive electrode including the positive active material; a negative electrode including a negative active material; and an electrolyte.

The positive electrode may include a positive current collector and a positive active material layer formed on the positive current collector. The positive active material layer may include a positive active material, a binder, and, optionally, a conductive material (e.g., an electrically conductive material).

Aluminum, nickel, and/or the like may be used as the positive current collector, but is not limited thereto. The positive active material layer may include a positive active material and optionally a positive electrode binder and a conductive material.

The positive active material is as described above, and may be included in an amount of about 95 wt % to about 99 wt % based on a total amount of the positive active material layer.

The positive active material layer may optionally further include a conductive material (e.g., an electrically conductive material) and a binder.

The conductive material is included to provide electrode conductivity (e.g., electrical conductivity) and any suitable electrically conductive material may be used as a conductive material unless it causes a chemical change (e.g., an undesirable change in the rechargeable lithium battery). Examples of the conductive material may include, for example, a carbon-based material such as natural graphite, artificial graphite, carbon black, acetylene black, ketjen black, carbon fiber, and the like; a metal-based material of a metal powder or a metal fiber including copper, nickel, aluminum silver, and the like; a conductive polymer such as a polyphenylene derivative; or a mixture thereof.

The binder adheres the positive active material particles to each other well, and also adheres the positive active material to the current collector. The binder may include a water-insoluble binder, a water-soluble binder, or a combination thereof.

The water-insoluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder and/or a polymer resin binder. The rubber-based binder may be selected from a styrene-butadiene rubber, an acrylated styrene butadiene rubber (SBR), an acrylonitrile butadiene rubber, an acrylic rubber, a butyl rubber, a fluorine rubber, and a combination thereof. The polymer resin binder may be selected from a polypropylene, ethylenepropylene copolymer, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When a water-soluble binder is used as the positive electrode binder, a cellulose-based compound capable of imparting viscosity may be further included as a thickener. The cellulose-based compound may be used by mixing one or more of carboxymethyl cellulose, hydroxypropylmethyl cellulose, methyl cellulose, and/or alkali metal salts thereof. The alkali metal may be Na, K, and/or Li. The thickener may be included in an amount of about 0.1 wt % to about 3 wt % based on a total amount of the positive active material.

The negative electrode may include a negative current collector, a negative active material layer on the negative current collector, and a negative functional layer on the negative active material layer.

The negative current collector may be one selected from a copper foil, a nickel foil, a stainless steel foil, a titanium foil, a nickel foam, a copper foam, a polymer substrate coated with a conductive metal, and a combination thereof.

The negative active material layer may be on the negative current collector. The negative active material layer may include a negative active material, and, optionally, a negative conductive material and a negative electrode binder.

The negative active material may be a material capable of reversibly intercalating/deintercalating lithium ions, a lithium metal, an alloy of lithium metal, a material capable of doping and undoping lithium, and/or a transition metal oxide.

Examples of the material capable of reversibly intercalating/deintercalating the lithium ions may include, for example, a carbon material such as, for example, a carbon-based negative active material generally used in a rechargeable lithium battery. Examples of the carbon-based negative active material may include crystalline carbon, amorphous carbon, or a combination thereof. Examples of the crystalline carbon include graphite such as, for example, non-shaped, plate-shaped, flake-shaped, sphere-shaped, and/or fibrous natural graphite and/or artificial graphite, and examples of the amorphous carbon include soft carbon and/or hard carbon), a mesophase pitch carbonized product, calcined cokes, and/or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/undoping lithium may include a silicon-based material, for example, Si, SiO$_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, SnO$_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like. At least one of them may be mixed with SiO$_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

The negative active material may be included in an amount of about 95 wt % to about 99 wt % based on a total weight of the negative active material layer.

The negative active material layer may optionally further include a negative conductive material and a negative electrode binder, and the negative conductive material and the negative electrode binder may be those described herein as the positive conductive material and the positive electrode binder, respectively.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like and the ketone-based solvent may include cyclohexanone, and/or the like. In addition, the alcohol-based solvent may include ethanol, isopropyl alcohol, and/or the like and the aprotic solvent may include nitriles such as R—CN (R is a C1 to C20 linear, branched, or cyclic hydrocarbon group, and may include a double bond, an aromatic ring, and/or an ether bond), and/or the like, amides such as dimethyl formamide and/or the like, dioxolanes such as 1,3-dioxolane and/or the like, sulfolanes, and/or the like.

The non-aqueous organic solvent may be used alone or in a mixture of two or more. When the organic solvent is used in a mixture, a mixing ratio may be adjusted in accordance with a desirable battery performance.

In addition, in the case of a carbonate-based solvent, it is desirable to use a mixture of cyclic carbonate and chain carbonate. In this case, the mixture of the cyclic carbonate and the chain carbonate in a volume ratio of about 1:1 to about 1:9 may exhibit excellent performance of the electrolyte.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound represented by Chemical Formula 3.

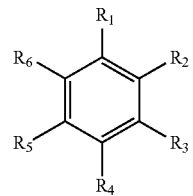

Chemical Formula 3

In Chemical Formula 3, $R_1$ to $R_6$ are independently selected from hydrogen, a halogen, a C1 to C10 alkyl group, a haloalkyl group, and a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous organic solvent may further include vinylene carbonate and/or an ethylene carbonate-based compound represented by Chemical Formula 4 in order to improve cycle-life of a battery.

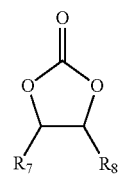

Chemical Formula 4

In Chemical Formula 4, $R_7$ and $R_8$ are independently selected from hydrogen, a halogen, a cyano group (CN), a nitro group ($NO_2$), and a fluorinated C1 to C5 alkyl group, provided that both $R_7$ and $R_8$ are not hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive used to improve cycle-life may be adjusted within a suitable or appropriate range.

The lithium salt according to an embodiment is dissolved in an organic solvent and plays a role of supplying lithium ions in a battery, operating a basic operation of the rechargeable lithium battery, and improving lithium ion transportation between positive and negative electrodes therein. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate; LiBOB), and a combination thereof. The lithium salt may be used in a concentration in a range of about 0.1 M to about 2.0 M. When the lithium salt is included at the foregoing concentration range, an electrolyte may have excellent performance and lithium ion mobility due to suitable or optimal electrolyte conductivity and viscosity.

A separator may be between the positive electrode and negative electrode. The separator may be, for example, selected from a glass fiber, polyester, polyethylene, polypropylene, polytetrafluoroethylene, and a combination thereof. It may have a form of a non-woven fabric or a woven fabric. For example, in a rechargeable lithium battery, a polyolefin-based polymer separator such as polyethylene and/or polypropylene is mainly used. In order to ensure the heat resistance or mechanical strength, a coated separator including a ceramic component and/or a polymer material may be used. Optionally, it may have a mono-layered or multi-layered structure.

The rechargeable lithium battery may be classified into a lithium ion battery, a lithium ion polymer battery, or a lithium polymer battery depending on kinds of a separator and an electrolyte. It also may be classified to be cylindrical, prismatic, coin-type, pouch-type, and the like depending on shape. In addition, it may be a bulk type and a thin film type depending on sizes. Any suitable structures and producing methods generally available in the art for lithium ion batteries may be used.

Hereinafter, as an example of a rechargeable lithium battery, a cylindrical rechargeable lithium battery is for example described.

Figure 2:
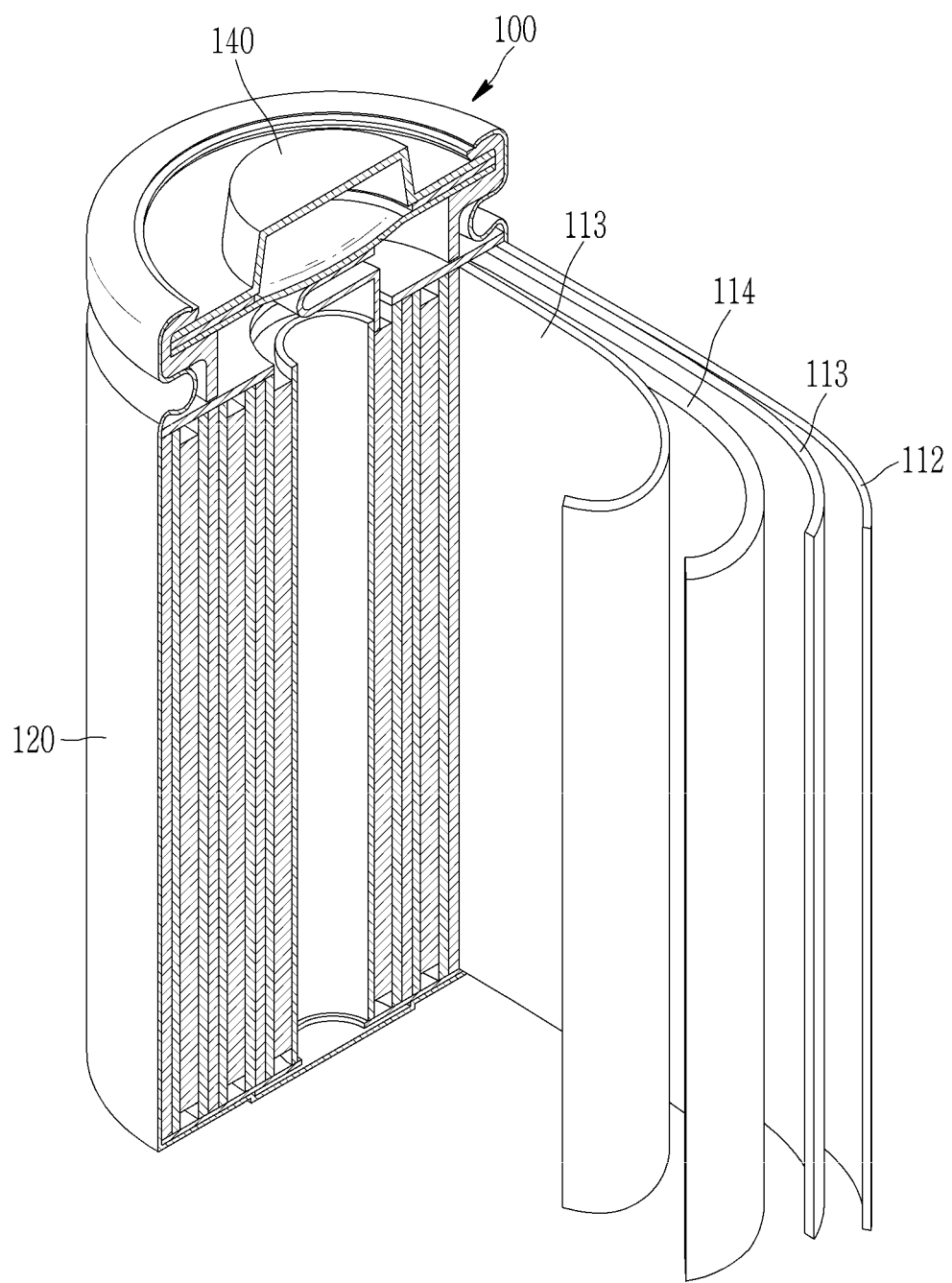
FIG. 2 is an exploded perspective view of a rechargeable lithium battery according to one embodiment.

FIG. 2 is an exploded perspective view of a rechargeable lithium battery according to one embodiment.

Referring to FIG. 2, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte that impregnates the negative electrode 112, the positive electrode 114, and the separator 113, a battery case 120 housing the battery cell, and a sealing member 140 sealing the battery case 120.

Hereinafter, the above aspects of embodiments of the present disclosure are illustrated in more detail with reference to examples. However, these examples are exemplary, and the present disclosure is not limited thereto.

Example 1

Nickel sulfate ($NiSO_4 \cdot 6H_2O$), cobalt sulfate ($CoSO_4 \cdot 7H_2O$), and manganese sulfate ($MnSO_4 \cdot H_2O$) in a Ni:Co:Mn mole ratio of 7:1.5:1.5 were dissolved in distilled water to prepare a transition metal solution, and phosphoric acid ($H_3PO_4$) as a phosphorus-containing compound was dissolved in distilled water in an amount that provides 0.15 wt % of phosphate in a final positive active material to prepare a phosphoric acid aqueous solution. In order to form a complex compound, ammonia ($NH_4OH$) as a chelating agent and sodium hydroxide (NaOH) as precipitant were prepared.

The transition metal solution and the phosphoric acid aqueous solution were mixed to have 0.5 moles of the phosphorus-containing compound based on 100 moles of the nickel-based composite hydroxide precursor to prepare a mixed solution. Additionally, a transition metal solution not including the phosphorus-containing compound was prepared.

Ammonia having a concentration of 0.5 mol/L (M) was put in a reactor and then, reacted while stirring at a power of 3.0 kW/m³ and at a temperature of 50° C. Subsequently, the mixed solution was injected into the reactor at 2.6 L/hr, the ammonia was injected at 0.39 L/hr, and then, sodium hydroxide (NaOH) was added thereto to maintain pH. Herein, the pH of the solution in the reactor was in a range of 11.10 to 11.30. Within the foregoing pH range, this process was performed until particles in the reactor had an average particle diameter ($D_{50}$) of 8 μm to 10 μm.

Subsequently, the stirring power of the reactor was reduced to 2.0 kW/m³, and the transition metal solution was injected into the reactor at 2.6 L/hr and the ammonia was injected into the reactor at 0.47 L/hr. Herein, the pH of the solution in the reactor was controlled to be in a range of 11.00 to 11.20. This process was performed until the particles in the reactor had an average particle diameter ($D_{50}$) of 12 μm to 13 μm. A portion of products was removed from the reactor during the reaction to prepare a nickel-based composite hydroxide precursor slurry solution.

The prepared nickel-based composite hydroxide precursor slurry solution was filtered, washed with highly pure distilled water, and dried in a hot air oven for 24 hours to obtain a nickel-based composite hydroxide precursor ($Ni_{0.7}Co_{0.15}Mn_{0.15}(OH)_2$) internally including a phosphate.

The obtained nickel-based composite hydroxide precursor and LiOH were mixed in a Li/Metal mole ratio of 1:1 with a mixer, calcined in a furnace at 780° C. under an oxygen atmosphere for 10 hours to obtain a positive active material including nickel-based composite oxide ($LiNi_{0.7}Co_{0.15}Mn_{0.15}O_2$) including a lithium transition metal phosphate coated in central grain boundaries and/or between primary particles.

Comparative Example 1

A nickel-based composite hydroxide precursor slurry solution was prepared according to the same method as Example 1 except that a transition metal solution including no phosphorus-containing compound was used instead of the mixed solution. Subsequently, phosphoric acid ($H_3PO_4$) as a phosphorus-containing compound was dissolved in distilled water so that a content of phosphate was 0.2 wt % and then, slowly added to the nickel-based composite hydroxide precursor slurry to prepare a slurry solution. Then, the slurry solution in the reactor was filtered, washed with highly pure distilled water, and dried in a hot air oven for 24 hours to obtain a nickel-based composite hydroxide precursor ($Ni_{0.7}Co_{0.15}Mn_{0.15}(OH)_2$) coated with phosphate on the secondary particle surface.

The prepared nickel-based composite hydroxide precursor and lithium hydroxide (LiOH) were mixed in a Li:metal mole ratio of 1:1 with a mixer and calcined at 780° C. in a furnace under an oxygen atmosphere for about 10 hours to obtain a positive active material including nickel-based composite oxide ($LiNi_{0.7}Co_{0.15}Mn_{0.15}O_2$) coated with lithium transition metal phosphate on the surface.

Comparative Example 2

A positive active material including a nickel-based composite oxide ($LiNi_{0.7}Co_{0.15}Mn_{0.15}O_2$) was prepared according to the same method as described with respect to Example 1 except that a transition metal solution including no phosphorus-containing compound was used instead of the mixed solution.

EVALUATION EXAMPLES

Evaluation Example 1: Residual Lithium Content Evaluation

Figure 3:
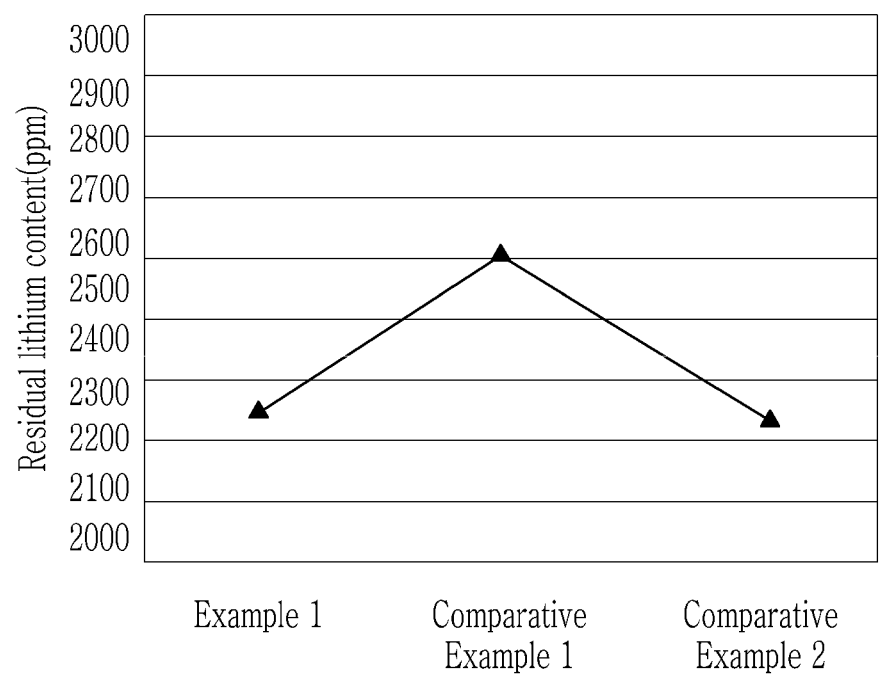
FIG. 3 is a graph showing residual lithium contents of the positive active material of Example 1, Comparative Example 1, and Comparative Example 2.

Residual lithium contents of the positive active materials of Example 1 and Comparative Examples 1 and 2 were measured and then, shown in FIG. 3.

Residual lithium on the positive active materials surfaces was measured utilizing an HCl titration method, and the method used was as follows. 10 g of each positive active material was put in distilled water, stirred with a stirrer for 30 minutes, and collected through a filter paper. Subsequently, the collected solution was put in a titrator (Metrohm 888), and a pH change thereof was measured, while HCl was injected thereinto. Because non-reacted residual lithium exists as $Li_2CO_3$, LiOH, and the like, $H^+$ reacts with $CO_3^{2-}$ ion or $OH^-$ ion during the injection of HCl thereby reaching titration, wherein an amount of the injected HCl solution was measured to calculate the non-reacted residual lithium content.

Referring to FIG. 3, the residual lithium content on the positive active material surface including the lithium transition metal phosphate according to Example 1 was equal to that on the positive active material surface including no lithium transition metal phosphate according to Comparative Example 2. Although the present application is not limited to any particular mechanism or theory, this result is believed to be because lithium in the lithium transition metal phosphate of Example 1 was substantially dissolved out in distilled water during the stirring of the positive active material with the distilled water and thus measured as non-reacted residual lithium (that is, the amount of the non-reacted residual lithium was reduced). Accordingly, the non-reacted residual lithium that causes a side reaction during operation of the battery except for lithium present as the lithium transition metal phosphate was observed to be in a smaller amount in the positive active material of Example 1 than that of Comparative Example 2.

On the other hand, the positive active material of Comparative Example 1, in which lithium transition metal phosphate was coated only on the surface of the nickel-based composite oxide secondary particle, exhibited deteriorated non-reacted residual lithium effects, as compared with that of Example 1.

Evaluation Example 2: Positive Active Material Cross-Section TOF-SIMS (Time-of-Flight Secondary Ion Mass Spectrometry) Analysis Internal cross-sections of the positive active materials according to Example 1 and Comparative Examples 1 and 2 were analyzed through TOF-SIMS (Time-of-Flight Secondary Ion Mass Spectrometry).

In order to perform the internal cross-section analysis, cross-section specimens of the positive active materials were prepared to comparatively analyze nickel (Ni) elements and phosphorus (P) elements inside the nickel-based composite oxide secondary particle through TOF-SIMS. The analysis was performed by comparing 150 μm*150 μm cross sections of particles of each specimen.

Figure 4:
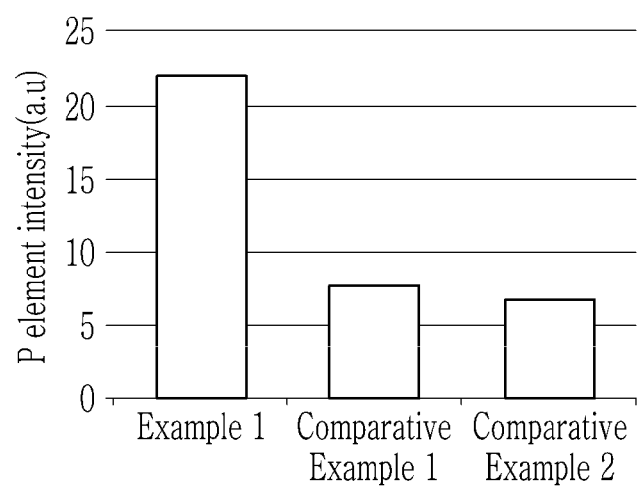
FIG. 4 is a graph showing P element intensities of the cross-section of the positive active materials according to Example 1, Comparative Example 1, and Comparative Example 2.

FIG. 4 is a graph showing P element intensities of the cross-sections of the positive active materials according to Example 1, Comparative Example 1, and Comparative Example 2.

Referring to FIG. 4, the positive active material of Comparative Example 1 was prepared by coating lithium transition metal phosphate on the secondary particle surface and thus exhibited similar P element intensity inside the particle to that (impurity level) of Comparative Example 2, but the positive active material of Example 1 exhibited relatively high P element intensity compared with that of Comparative Example 1. Accordingly, the positive active material of Example 1 was observed to exhibit a high concentration of the lithium transition metal phosphate in the interior and central portion of the secondary particle.

Evaluation Example 3: High Temperature (45° C.) Cycle-Life Evaluation

The positive active materials of Example 1 and Comparative Examples 1 and 2 were respectively used to prepare coin cells as follows.

96 g of each positive active material according to Example 1 and Comparative Examples 1 and 2, 2 g of polyvinylidene fluoride, and 2 g of carbon black as a conductive agent were mixed in 47 g of an N-methylpyrrolidone solvent to prepare slurries for a positive active material layer.

Each slurry for a positive active material layer was coated on an aluminum film by using a doctor blade and made into a thin electrode plate, dried at 135° C. for 3 hours or more, rolled, and dried under vacuum to prepare positive electrodes.

Each of the positive electrode, a lithium metal counter electrode, a separator and an electrolyte were used in an existing method to prepare 2032 type coin cells. As for the separator, a porous polyethylene (PE) film (a thickness: about 16 μm) was used, and the electrolyte was prepared by dissolving 1.1 M $LiPF_6$ in a mixed solvent of ethylene carbonate (EC) and ethylmethylcarbonate (EMC) (a volume ratio of 3:5).

The prepared coin cells were once charged and discharged at 0.1 C at room temperature for formation. The charge started in a CC (constant current) mode and then was converted into a CV (a constant voltage) mode and cut off at 4.3 V and 0.05 C, and the discharge was performed in the CC (constant current) mode and cut off at 3.0 V. Subsequently, the cells were 70 times charged and discharged at 1 C in a charge and discharge chamber at 45° C. to evaluate high temperature cycle-life characteristics. In the capacity evaluation, the charge started in the CC (constant current) mode and then, was converted into CV (constant voltage) and cut off at 4.3 V and 0.05 C, and the discharge was performed in the CC (constant current) mode and then, cut off at 3.0 V.

Figure 5:
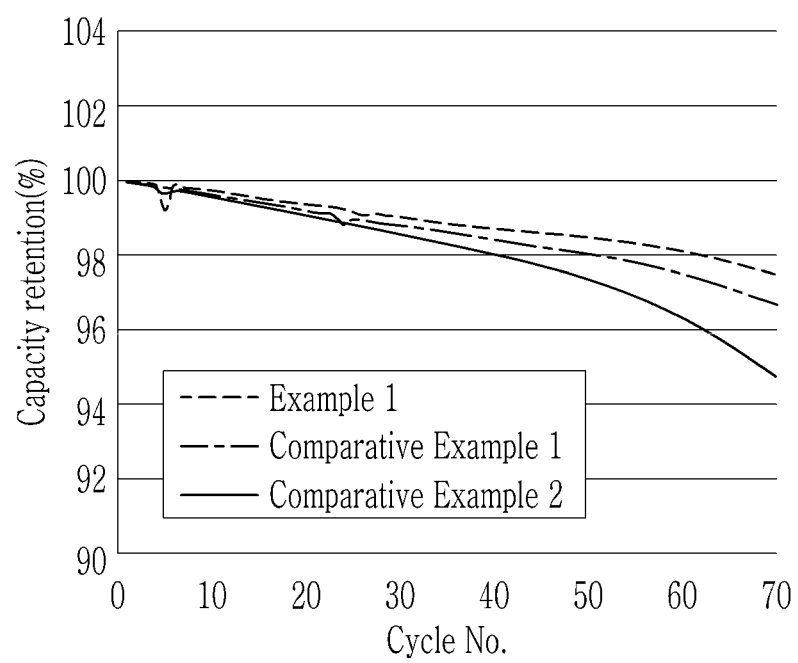
FIG. 5 is a graph showing the high temperature cycle-life characteristics of the coin cells made of the positive active materials according to Example 1, Comparative Example 1, and Comparative Example 2.

The high temperature cycle-life characteristic evaluation results are shown in FIG. 5. FIG. 5 is a graph showing the high temperature cycle-life characteristics of the coin cells made of the positive active materials according to Example 1, and Comparative Examples 1 and 2. Referring to FIG. 5, the coin cell prepared by using the positive active material of Example 1 exhibited excellent cycle-life characteristics as compared with the cells according to Comparative Examples 1 and 2, as charge and discharge cycles were increased.

Example 1 and Comparative Example 1 including a lithium transition metal phosphate coating in the positive active materials exhibited excellent cycle-life characteristics as compared with Comparative Example 2. On the other hand, as the number of the cycles is increased, secondary particle included in a positive active material are more frequently deformed, and accordingly, the insides of the secondary particle are exposed, and a side reaction with the electrolyte is increased. However, the positive active material of Example 1 that had the lithium transition metal phosphate present in the grain boundaries of the nickel-based composite oxide secondary particle (and/or between a plurality of the nickel-based composite oxide primary particles), and thus, the side reaction with the electrolyte was more effectively prevented, as compared with that of Comparative Example 1 including the lithium transition metal phosphate coating only on the surface of the nickel-based composite oxide secondary particle. As a result, high temperature cycle-life characteristics of the coin cell of Example 1 were improved, as compared with those of the coin cell of Comparative Example 1.

Evaluation Example 4: High Temperature Gas Generation Evaluation

Figure 6:
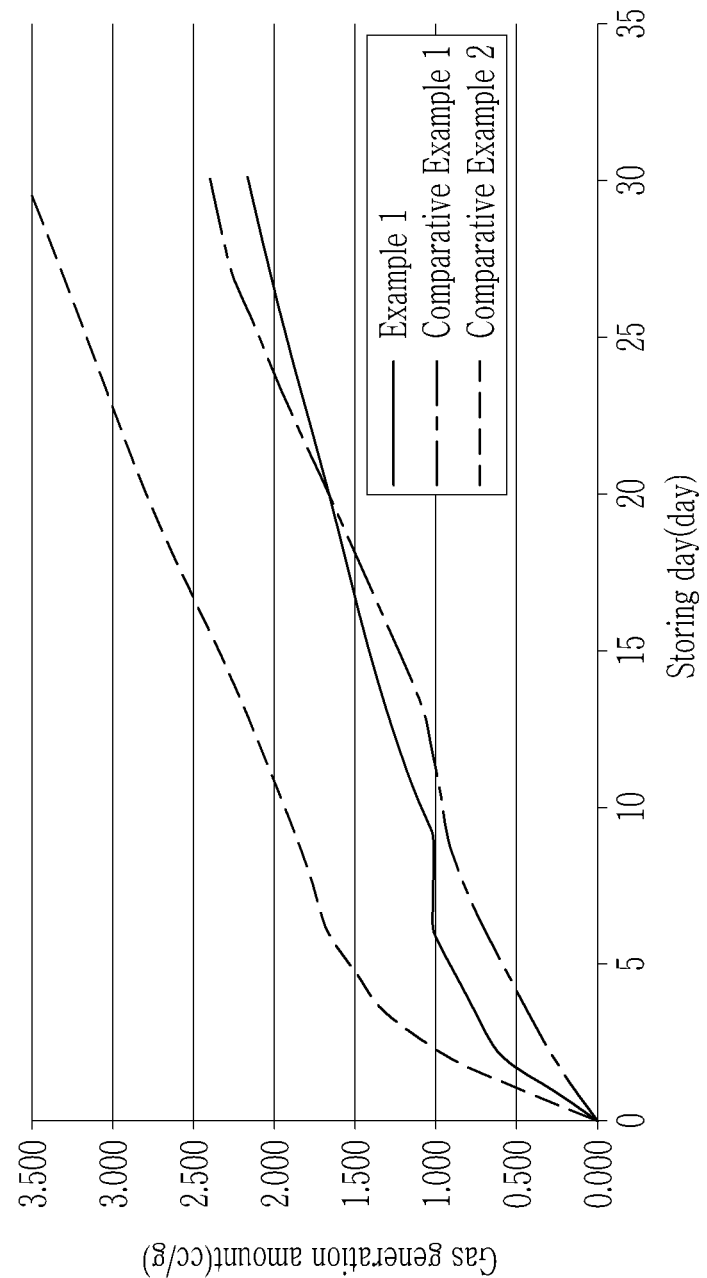
FIG. 6 is a graph showing high-temperature gas generation amounts of the coin cells made of the positive active materials according to Example 1, Comparative Example 1, and Comparative Example 2.

The coin cells prepared in Evaluation Example 3 were twice in total charged and discharged at room temperature (25° C.). In the 1st cycle, the coin cells were constant current charged at a current rate of 0.1 C until a voltage of 4.3 V (vs. Li) is reached and subsequently, cut off at a current rate of 0.05 C, while 4.3 V was maintained in the constant voltage mode. Subsequently, the coin cells were constant current discharged at a 0.1 C rate until the voltage reached 3.0 V (vs. Li) during the discharge. In the 2nd cycle, the coin cells were constant current charged at a current rate of 0.1 C until a voltage of 4.3 V (vs. Li) is reached at 25° C. and subsequently, cut off at a current rate of 0.05 C, while 4.3 V was maintained in the constant voltage mode, and then, the charged coin cells were disassembled. Subsequently, each electrode plate along with the electrolyte was put in a pouch and stored in an oven at 60° C. to measure a volume change of the pouch and convert the volume change into a mass change in an Archimedes method and thus obtain a gas generation amount depending on the number storing days, and the results are shown in FIG. 6. FIG. 6 is a graph showing high-temperature gas generation amounts of the coin cells made of the positive active materials according to Example 1, Comparative Example 1, and Comparative Example 2. Referring to FIG. 6, the coin cell including the positive active material of Example 1 exhibited an improved gas generation amount, as compared with the coin cells according to Comparative Examples 1 and 2.

While the subject matter of this disclosure has been described in connection with what are presently considered to be practical example embodiments, it is to be understood that the present disclosure is not limited to the disclosed embodiments, but, on the contrary, is intended to cover various modifications and equivalent arrangements included within the spirit and scope of the appended claims, and equivalents thereof.

DESCRIPTION OF SYMBOLS

10: nickel-based composite oxide secondary particle
11: nickel-based composite oxide primary particle
13: grain boundary of nickel-based composite oxide secondary particle (space between a plurality of nickel-based composite oxide primary particles)
15: central portion of nickel-based composite oxide
17: surface portion of nickel-based composite oxide
100: rechargeable lithium battery
112: negative electrode
113: separator
114: positive electrode
120: battery case
140: sealing member

What is claimed is:

1. A positive active material precursor for a rechargeable lithium battery comprising:
a nickel-based composite precursor comprising a secondary particle comprising a plurality of primary particles that are aggregated together,
the nickel-based composite precursor having a central portion and a surface portion, and
the central portion of the nickel-based composite precursor comprising a phosphate between adjacent ones of the plurality of primary particles,
wherein the nickel-based composite precursor of the surface portion is represented by Chemical Formula 2,
a concentration of the phosphate in the central portion of the nickel-based composite hydroxide precursor is higher than a concentration of the phosphate in the surface portion:

$$Ni_xCo_yMn_zM_{1-x-y-z}(OH)_2 \quad \text{[Chemical Formula 2]}$$

wherein, in Chemical Formula 2,
0.7≤x≤1, 0≤y≤0.5, 0≤z≤0.5, 0.5≤x+y+z≤1, and M is at least one selected from Mn, Ni, Co, Al, Fe, V, Ti, and Cr.

2. The positive active material precursor of claim 1, wherein:
the surface portion of the nickel-based composite precursor comprises a first surface portion contacting the central portion of the nickel-based composite precursor and a second surface portion surrounding the first surface portion, and
at least one selected from the first surface portion and the second surface portion does not comprise phosphate.

3. The positive active material precursor of claim 1, wherein the central portion of the nickel-based composite precursor has a volume of 20 volume % to 70 volume % relative to a total volume of the secondary particle.

4. A positive active material for a rechargeable lithium battery comprising:
a nickel-based composite oxide comprising a secondary particle comprising a plurality of primary particles that are aggregated together,
the nickel-based composite oxide having a central portion and a surface portion, and
the central portion comprising a lithium transition metal phosphate between adjacent ones of the plurality of primary particles,
wherein the nickel-based composite oxide of the surface portion is represented by Chemical Formula 1, and
a concentration of the lithium transition metal phosphate in the central portion of the nickel-based composite oxide is higher than a concentration of the lithium transition metal phosphate in the surface portion of the nickel-based composite oxide:

$$Li_aNi_xCo_yMn_zM_{1-x-y-z}O_2 \quad \text{[Chemical Formula 1]}$$

wherein, in Chemical Formula 1,
0.8≤a≤1.2, 0.7≤x≤1, 0≤y≤0.5, 0≤z≤0.5, 0.5≤x+y+z≤1, and M is at least one selected from Mn, Ni, Co, Al, Fe, V, Ti, and Cr.

5. The positive active material of claim 4, wherein the central portion of the nickel-based composite oxide has a volume of 20 volume % to 70 volume % relative to a total volume of the secondary particle.

6. The positive active material of claim 4, wherein the lithium transition metal phosphate is present at grain boundaries of the secondary particle of the nickel-based composite oxide or between adjacent ones of the plurality of the primary particles of the nickel-based composite oxide.

7. The positive active material of claim 4, wherein lithium transition metal phosphate is included in an amount in a range of 0.01 wt % to 2 wt % based on a total amount of the positive active material.

8. The positive active material of claim 4, wherein the nickel-based composite oxide further comprises a coating layer comprising the lithium transition metal phosphate on the surface portion of the nickel-based composite oxide.

9. The positive active material of claim 8, wherein the coating layer has a thickness of less than or equal to 3 μm.

10. A method of preparing a positive active material for a rechargeable lithium battery, the method of comprising:

preparing a mixed solution comprising a transition metal solution comprising a nickel raw material, a manganese raw material, a cobalt raw material, a phosphorus-containing compound including at least one selected from a phosphoric acid and a phosphate, and, optionally, further comprising a metal raw material, introducing the mixed solution, a chelating agent, and a precipitating agent into a reactor to perform a co-precipitation method, at a stirring power of about 1.0 kW/m$^3$ to about 5.0 kW/m$^3$, and then introducing the transition metal solution, and the chelating agent into the reactor to perform the co-precipitation method at the reduced stirring power and prepare a secondary particle precursor, drying the secondary particle precursor to prepare a nickel-based composite precursor, and mixing the nickel-based composite precursor and a lithium raw material and calcining the mixture to prepare the positive active material of claim 4.

11. The method of claim 10, wherein the phosphorus-containing compound comprises at least one selected from $NH_4H_2PO_4$, $H_3PO_4$, and $(NH_4)_2HPO_4$.

12. The method of claim 10, wherein the phosphorus-containing compound is mixed in a mole ratio in a range of about 0.01 mole to about 1 mole based on 100 moles of the nickel-based composite precursor.

13. A rechargeable lithium battery comprising:

a positive electrode comprising the positive active material of claim 4;

a negative electrode; and an electrolyte.

* * * * *